(12) United States Patent
Vincent et al.

(10) Patent No.: US 10,683,421 B2
(45) Date of Patent: Jun. 16, 2020

(54) METHOD FOR THE TRANSPORTATION AND/OR STORAGE OF ROAD BITUMEN

(71) Applicant: TOTAL MARKETING SERVICES, Puteaux (FR)

(72) Inventors: Régis Vincent, Grigny (FR); Mouhamad Mouazen, Lyons (FR); Laurence Lapalu, Villeurbanne (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

(21) Appl. No.: 15/501,040

(22) PCT Filed: Jul. 29, 2015

(86) PCT No.: PCT/EP2015/067409
§ 371 (c)(1),
(2) Date: Feb. 1, 2017

(87) PCT Pub. No.: WO2016/016320
PCT Pub. Date: Feb. 4, 2016

(65) Prior Publication Data
US 2017/0218177 A1    Aug. 3, 2017

(30) Foreign Application Priority Data
Aug. 1, 2014 (FR) ...................... 14 57537

(51) Int. Cl.
| | |
|---|---|
| C08L 95/00 | (2006.01) |
| C08K 5/092 | (2006.01) |
| C08K 5/16 | (2006.01) |
| C08K 5/25 | (2006.01) |
| E01C 7/18 | (2006.01) |
| C07G 1/00 | (2011.01) |

(52) U.S. Cl.
CPC .............. *C08L 95/00* (2013.01); *C08K 5/092* (2013.01); *C08K 5/16* (2013.01); *C08K 5/25* (2013.01); *C07G 1/00* (2013.01); *C08L 2555/22* (2013.01); *C08L 2555/26* (2013.01); *C08L 2555/40* (2013.01); *C08L 2555/60* (2013.01); *C08L 2555/80* (2013.01); *E01C 7/18* (2013.01)

(58) Field of Classification Search
CPC .. C08L 95/00; C08L 2555/22; C08L 2555/26; C08L 2555/60; C08L 2555/52; C08K 5/25; C08K 5/092; C08K 3/34; C08K 3/40; C09D 195/00; C10C 3/00; E01C 7/00; E01C 7/18; E01C 7/187; E01C 9/086; E01C 19/08; E01C 19/10; E01C 19/1004; E01C 19/45
See application file for complete search history.

(56) References Cited

U.S. PATENT DOCUMENTS

| | | | | |
|---|---|---|---|---|
| 2,387,514 | A | | 10/1945 | Holmes |
| 3,483,153 | A | * | 12/1969 | Pitchford ................ C10C 3/026 106/269 |
| 5,254,385 | A | * | 10/1993 | Hazlett ................ C04B 20/1029 428/402.24 |
| 6,011,094 | A | * | 1/2000 | Planche ................. C08L 95/00 524/68 |
| 2007/0027235 | A1 | * | 2/2007 | Marchal ................. C08L 23/02 524/59 |
| 2009/0137705 | A1 | * | 5/2009 | Faucon Dumont ..... C04B 26/26 524/71 |
| 2010/0192804 | A1 | * | 8/2010 | Lapalu ................. C08K 5/0008 106/277 |
| 2010/0273915 | A1 | * | 10/2010 | Choen .................... C08L 95/00 523/351 |
| 2011/0233105 | A1 | * | 9/2011 | Bailey ................. C09D 195/00 206/525 |

(Continued)

FOREIGN PATENT DOCUMENTS

| | | |
|---|---|---|
| WO | 2007/058994 A2 | 5/2007 |
| WO | 2008/137394 A1 | 11/2008 |

(Continued)

OTHER PUBLICATIONS

Cramp, Lucy et al., "Molecules from the past Archaeology meets chemistry," Catalyst, Feb. 2010, pp. 1-4.
Nissenbaum, Arie et al., "The floating asphalt blocks of the Dead Sea,"Physics and Chemistry of The Earth, Jan. 1980, pp. 157-161.
Forbes, Robert J, "Studies in Ancient Technology ED—Forbes," Jan. 1, 1993, pp. 1-135, vol. I, 3rd edition.
Sep. 17, 2015 International Search Report issued in International Patent Application No. PCT/EP2015/067409.
Pan, "Rules for Petroleum Product Packaging, Storage and Transportation and Delivery Acceptance," Ocean Press, p. 772, May 31, 2011.

*Primary Examiner* — Alexandra M Moore
(74) *Attorney, Agent, or Firm* — Oliff PLC

(57) ABSTRACT

A process for the transportation and/or storage of road bitumen under cold conditions, including at least one chemical additive chosen from: a general formula compound (I): $R^1$—$(COOH)_z$ wherein $R^1$ is a linear or branched, saturated or unsaturated hydrocarbon-based chain including 4 to 68 carbon atoms, and z is an integer ranging from 1 to 4, and a general formula compound (II): $R$—$(NH)_n CONH$—$(X)_m$—$NHCO(NH)_n$—$R'$ wherein: $R$ and $R'$, which are identical or different, contain a saturated or unsaturated, linear or branched, cyclic or acyclic hydrocarbon-based chain having 1 to 22 carbon atoms and optionally including heteroatoms and/or rings having 3 to 12 atoms and/or heterocycles having 3 to 12 atoms; X contains a saturated or unsaturated, linear or branched, cyclic or acyclic hydrocarbon-based chain having 1 to 22 carbon atoms and optionally including one or more heteroatoms and/or rings having 3 to 12 atoms and/or heterocycles having 3 to 12 atoms.

25 Claims, No Drawings

(56) References Cited

U.S. PATENT DOCUMENTS

| | | | |
|---|---|---|---|
| 2011/0290695 A1* | 12/2011 | Thomas | C08L 95/00 206/524.1 |
| 2012/0123028 A1 | 5/2012 | Dreesen et al. | |
| 2013/0041075 A1* | 2/2013 | Harders | C08L 95/00 524/68 |
| 2015/0183994 A1 | 7/2015 | Basset et al. | |

FOREIGN PATENT DOCUMENTS

| | | |
|---|---|---|
| WO | 2011/013073 A1 | 2/2011 |
| WO | 2014/005935 A1 | 1/2014 |

* cited by examiner

METHOD FOR THE TRANSPORTATION AND/OR STORAGE OF ROAD BITUMEN

TECHNICAL FIELD

A subject of the present invention is a process for the transportation and/or storage of road bitumen. The present invention also relates to the use of bitumen blocks according to the invention as road binder, and also to their use in manufacturing mixes.

PRIOR ART

The vast majority of bitumen is used in construction, mainly for the manufacture of road carriageways or in industry, for example for roofing applications. It is generally in the form of a black material which is highly viscous, or even solid at ambient temperature, and which liquefies when heated. Generally, bitumen is stored and transported under hot conditions, in bulk, in tanker trucks or by boats at high temperatures of about 120° C. to 160° C. However, the storage and transportation of bitumen under hot conditions has certain drawbacks. Firstly, the transportation of bitumen under hot conditions in liquid form is considered to be dangerous and it is highly restricted from a regulatory point of view. This mode of transportation does not present particular difficulties when the transportation equipment and infrastructures are in good condition. If this is not the case, it can become problematic: if the tanker truck is not sufficiently lagged, the bitumen may become viscous during an excessively long trip. Bitumen delivery distances are therefore limited. Secondly, maintaining bitumen at high temperatures in tanks or in tanker trucks consumes energy. In addition, maintaining the temperature of the bitumen for a given period may affect the properties of the bitumen, especially the ageing properties and thus change the final performance properties of the mix.

In order to overcome the problems of transporting and storing bitumen under hot conditions, packaging solutions for transporting and storing bitumens under cold conditions have been developed. This mode of transportation of bitumen in packaging under cold conditions represents only a minimal fraction of the amounts transported throughout the world, but it corresponds to very real needs for geographic regions which are difficult and expensive to access using conventional transportation means.

By way of example, mention may be made of transporting bitumen at ambient temperature in metal barrels. This means is increasingly questionable from an environmental point of view since the cold bitumen stored in the barrels must be reheated before it is used as road binder. However, this operation is difficult to carry out for this type of packaging and the barrels constitute waste after use. Furthermore, the storage of bitumen under cold conditions in barrels results in losses since the bitumen is very viscous and a part of the product remains on the walls of the barrel when the bitumen is transferred into the tanks of mix production units. With regard to the handling and transportation of bituminous products in these barrels, they can prove to be difficult and dangerous if the specialized equipment for handling the barrels is not available in the transporters or at the site where the bitumen is used.

The packaging of bituminous products in paper bags or in thermoplastic material, such as polypropylene or polyethylene, has been the subject of recent developments. By way of example, patent application US 2011/0290695 describes a system for dispensing and packaging bituminous products in block form. Each bitumen block is surrounded by a film of bituminous composition, consisting of approximately 10 to 30% by weight of natural bitumen and approximately 5 to 25% by weight of a synthetic elastomer and copolymers. The film of bituminous composition is melted with the bituminous product and is entirely compatible with the melted bitumen.

However, it has been observed that bituminous products packaged in the form of paper bags or bags made of thermoplastic material may creep during the handling, storage and transportation thereof, because the bags or films made of thermoplastic material may be pierced, increasing the risks of deformation and of leakage, especially when the external temperature is high. When the bags or films made from thermoplastic material are pierced, the bitumen flows and the bags or blocks surrounded by film made of thermoplastic material stick to one another. Handling of the bags or blocks surrounded by film made of thermoplastic material degraded in this way becomes impossible, which makes them unusable.

Despite the recent development in the packaging of bituminous products, there is still a need to find a solution for storing and transporting road bitumen and bituminous materials under cold conditions, which makes it possible to overcome the drawbacks mentioned above.

In particular, the aim of the present invention is to propose an improved process for transportation and/or storage under cold conditions.

Another aim of the invention is to propose a process enabling easy handling of the road bitumen during handling operations.

Another aim of the invention is to propose an ecological and economical method for transporting road bitumen and avoiding the use of additional means for maintaining the temperature of said bitumen during transport and/or storage.

Another aim of the invention is to propose an ecological method which makes it possible to minimise the presence of waste and/or residues.

SUBJECT OF THE INVENTION

The subject of the invention relates to a process for the transportation and/or storage of road bitumen under cold conditions, said bitumen being transported and/or stored in bitumen block form and comprising at least one chemical additive chosen from:

a compound of general formula (I): $R^1$—$(COOH)_z$ in which $R^1$ is a linear or branched, saturated or unsaturated hydrocarbon-based chain comprising from 4 to 68 carbon atoms, preferably from 4 to 54 carbon atoms, more preferentially from 4 to 36 carbon atoms, and z is an integer ranging from 1 to 4, preferably from 2 to 4, and a compound of general formula (II): R—$(NH)_n$CONH—$(X)_m$—NHCO$(NH)_n$—R' in which:

R and R', which are identical or different, contain a saturated or unsaturated, linear or branched, cyclic or acyclic hydrocarbon-based chain having from 1 to 22 carbon atoms and optionally comprising heteroatoms and/or rings having from 3 to 12 atoms and/or heterocycles having from 3 to 12 atoms;

X contains a saturated or unsaturated, linear or branched, cyclic or acyclic hydrocarbon-based chain having from 1 to 22 carbon atoms and optionally comprising one or more heteroatoms and/or rings having from 3 to 12 atoms and/or heterocycles having from 3 to 12 atoms;

n and m are integers having, independently of one another, a value of 0 or of 1.

The term "road bitumen" is intended to mean bituminous compositions consisting of one or more bitumen bases and comprising one or more chemical additives, said compositions being intended for a road application.

According to one particular embodiment, the road bitumen is transported and/or stored at a temperature of less than 100° C. In particular, the temperature of transportation and/or storage corresponds to the ambient temperature. "Ambient temperature" is intended to mean the temperature which is reached during transportation and/or storage of the bitumen according to the invention, without said bitumen being heated by any type of process. Thus, the ambient temperature may reach high temperatures, less than 100° C. during summer periods, in particular in geographical regions with a hot climate.

According to a particular preferential embodiment, the bitumen is transported and/or stored at a temperature of between 20° C. and 90° C., preferably of between 20° C. and 80° C., more preferentially of between 40° C. and 80° C., even more preferentially of between 50° C. and 70° C., even more preferably of between 40° C. and 60° C.

According to a particular embodiment, the chemical additive is a compound of general formula (I): $R^1$—$(COOH)_z$ in which $R^1$ is a linear or branched, saturated or unsaturated hydrocarbon-based chain comprising from 4 to 68 carbon atoms, preferably from 4 to 54 carbon atoms, more preferentially from 4 to 36 carbon atoms, and z is an integer ranging from 1 to 4, preferably from 2 to 4.

According to a particular preferential embodiment, the compound is a diacid of general formula HOOC—$C_wH_{2w}$—COOH, in which w is an integer ranging from 4 to 22, preferably from 4 to 12.

Advantageously, the compound is a diacid chosen from the group consisting of adipic acid, pimelic acid, suberic acid, azelaic acid, sebacic acid, undecanedioic acid, 1,2-dodecanedioic acid and tetradecanedioic acid.

According to a particular embodiment, the chemical additive is a compound of general formula (II): R—$(NH)_n$CONH—$(X)_m$—NHCO$(NH)_n$—R' in which:
- R and R', which are identical or different, contain a saturated or unsaturated, linear or branched, cyclic or acyclic hydrocarbon-based chain having from 1 to 22 carbon atoms and optionally comprising heteroatoms and/or rings having from 3 to 12 atoms and/or heterocycles having from 3 to 12 atoms;
- X contains a saturated or unsaturated, linear or branched, cyclic or acyclic hydrocarbon-based chain having from 1 to 22 carbon atoms and optionally comprising one or more heteroatoms and/or rings having from 3 to 12 atoms and/or heterocycles having from 3 to 12 atoms;
- n and m are integers having, independently of one another, a value of 0 or of 1.

According to a particular preferential embodiment, the compound comprises a hydrazide unit when n and m have a value of 0.

Advantageously, the R and/or R' groups, which are identical or different, comprise one or more aromatic monocyclic or polycyclic rings or heterocycles, optionally substituted by one or more hydroxyl functions and/or one or more saturated, linear or branched hydrocarbon-based chains, having from 1 to 6 carbon atoms.

According to a particular preferential embodiment, the compound comprises two amide units when n has a value of 0 and m has a value of 1.

According to a particular preferential embodiment, the R and/or R' groups, which are identical or different, comprise an aliphatic hydrocarbon-based chain having 4 to 22 carbon atoms, especially chosen from the groups $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$, $C_{22}H_{45}$.

Advantageously, the X group comprises an aliphatic hydrocarbon-based chain having 1 to 2 carbon atoms.

According to one particular embodiment, the road bitumen comprises from 0.1% to 5% by weight, preferably from 0.5% to 4% by weight, more preferentially from 0.5% to 2.5% by weight of the chemical additive relative to the total weight of said bitumen.

According to another particular embodiment, the road bitumen comprises from 5% to 30% by weight, preferably from 6% to 28% by weight, more preferentially from 7% to 26% by weight of the chemical additive relative to the total weight of said bitumen.

According to one particular embodiment, the road bitumen comprises between 0.05% and 15% by weight, preferably between 0.1% and 10% by weight, more preferentially between 0.5% and 6% by weight of an olefinic polymer adjuvant.

A subject of the invention also relates to the use of bitumen block as road binder, said bitumen block consisting of road bitumen as described in the process according to the invention.

According to one particular embodiment, the bitumen block is used for manufacturing mixes, said bitumen block consisting of road bitumen as described in the process according to the invention.

DETAILED DESCRIPTION

According to one particular embodiment, a road bitumen is prepared by bringing into contact:
- at least one bitumen base,
- between 0.1% and 5% by weight, preferably between 0.5% and 4% by weight and more preferably between 0.5% and 2.5% by weight of a chemical additive.

According to another particular embodiment, a road bitumen is prepared by bringing into contact:
- at least one bitumen base,
- between 5% and 30% by weight, preferably between 6% and 28% by weight, more preferentially between 7% and 26% by weight of the chemical additive relative to the total weight of said bitumen.

Within the meaning of the invention, when the road bitumen comprises between 5% and 30% by weight, preferably between 6% and 28% by weight, more preferentially between 7% and 26% by weight of the chemical additive relative to the total weight of said bitumen, said road bitumen may also be referred to as concentrated road bitumen.

Throughout the remainder of the description, the percentages by weight are calculated relative to the total weight of the bitumen.

The operation is carried out at manufacturing temperatures of between 100° C. and 200° C., preferably between 140° C. and 200° C. and more preferentially between 140° C. and 170° C., and with stirring for a period of time of at least 10 minutes, preferably of between 30 minutes and 10 hours and more preferentially between 1 hour and 6 hours. The term "manufacturing temperature" is intended to mean the temperature to which the bitumen base is heated before mixing and also the mixing temperature. The heating temperature and time vary according to the amount of bitumen used and are defined by standard NF EN 12594.

Among the bitumen bases that can be used according to the invention, mention may be made first of all of bitumens of natural origin, those contained in natural bitumen or natural asphalt deposits or bituminous sands and bitumens originating from the refining of crude oil. The bitumen bases according to the invention are advantageously chosen from bitumen bases originating from the refining of crude oil. The bitumen bases may be chosen from bitumen bases or mixtures of bitumen bases originating from the refining of crude oil, in particular bitumen bases containing asphaltenes. The bitumen bases can be obtained by conventional processes for manufacturing bitumen bases in refining, in particular by direct distillation and/or vacuum distillation of oil. These bitumen bases can optionally be visbroken and/or deasphalted and/or air-rectified. The various bitumen bases obtained by means of refining processes can be combined with one another to obtain the best technical compromise. The bitumen base may also be a bitumen base from recycling. The bitumen bases may be bitumen bases of hard grade or of soft grade. The bitumen bases according to the invention have a penetrability, measured at 25° C. according to standard EN 1426, of between 5 and 300 1/10 mm, preferably between 10 and 100 1/10 mm, more preferentially between 30 and 100 1/10 mm.

According to a particular embodiment, the chemical additive may be a compound of the following general formula (I):

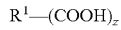

in which $R^1$ is a linear or branched, saturated or unsaturated hydrocarbon-based chain comprising from 4 to 68 carbon atoms, preferably from 4 to 54 carbon atoms, more preferentially from 4 to 36 carbon atoms, and z is an integer ranging from 1 to 4, preferably from 2 to 4, more preferentially equal to 2.

The chemical additives corresponding to the formula (I) may advantageously be monoacids (z=1), diacids (z=2), triacids (z=3) or tetracids (z=4). The preferred chemical additives are diacids with z=2. Similarly, the $R^1$ group is preferably a linear and saturated hydrocarbon-based chain of formula $C_wH_{2w}$ with w an integer ranging from 4 to 22, preferably from 4 to 12.

The chemical additives have, in particular, the general formula HOOC—$C_wH_{2w}$—COOH, where w is an integer ranging from 4 to 22, preferably from 4 to 12. These chemical additives correspond to the above formula (I) in which z=2 and $R^1$=$C_wH_{2w}$.

The preferred diacids are as follows:
adipic acid or 1,6,-hexanedioic acid, with w=4
pimelic acid or 1,7,-heptanedioic acid, with w=5
suberic acid or 1,8,-octanedioic acid, with w=6
azelaic acid or 1,9,-nonanedioic acid, with w=7
sebacic acid or 1,10,-decanedioic acid, with w=8
undecanedioic acid, with w=9
1,2-dodecanedioic acid, with w=10
tetradecanedioic acid, with w=12.

Advantageously, the diacid is sebacic acid.

The diacids may also be diacid dimers of unsaturated fatty acid(s), i.e. dimers formed from at least one unsaturated fatty acid, for example from a single unsaturated fatty acid or from two different unsaturated fatty acids. The diacid dimers of unsaturated fatty acid(s) are conventionally obtained by intermolecular dimerization reaction of at least one unsaturated fatty acid (Diels-Alder reaction for example). Preferably, a single type of unsaturated fatty acid is dimerized. They derive in particular from the dimerization of an unsaturated fatty acid which is especially $C_8$ to $C_{34}$, especially $C_{12}$ to $C_{22}$, in particular $C_{16}$ to $C_{20}$, and more particularly $C_{18}$. A preferred fatty acid dimer is obtained by dimerization of linoleic acid, it being possible for the latter to be subsequently partially or totally hydrogenated. Another preferred fatty acid dimer has the formula HOOC—$(CH_2)_7$—CH=CH—$(CH_2)_7$—COOH. Another preferred fatty acid dimer is obtained by dimerization of methyl linoleate. In the same way, it is possible to have fatty acid triacids and fatty acid tetraacids, obtained respectively by trimerization and tetramerization of at least one fatty acid.

According to another particular embodiment, the chemical additive may be a compound of the following general formula (II):

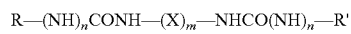

in which:
R and R', which are identical or different, contain a saturated or unsaturated, linear or branched, cyclic or acyclic hydrocarbon-based chain having from 1 to 22 carbon atoms and optionally comprising heteroatoms and/or rings having from 3 to 12 atoms and/or heterocycles having from 3 to 12 atoms;
X contains a saturated or unsaturated, linear or branched, cyclic or acyclic hydrocarbon-based chain having from 1 to 22 carbon atoms and optionally comprising one or more heteroatoms and/or rings having from 3 to 12 atoms and/or heterocycles having from 3 to 12 atoms;
n and m are integers having, independently of one another, a value of 0 or of 1.

According to a variant of the invention, the integer m has a value of 0. In this particular case, the R—$(NH)_n$CONH and NHCO$(NH)_n$—R' groups are covalently bonded to one another via a hydrazide linkage CONH—NHCO. The R and/or R' groups, which are identical or different, then comprise a group chosen from at least one hydrocarbon-based chain having at least 4 carbon atoms, at least one aliphatic ring having 3 to 8 atoms, at least one aliphatic, partially aromatic or entirely aromatic fused polycyclic system, each ring comprising 5 or 6 atoms, taken alone or in a mixture.

Preferably, the R and/or R' groups, which are identical or different, are linear saturated hydrocarbon-based chains comprising from 4 to 22 carbon atoms. Among the preferred linear saturated hydrocarbon-based chains, mention may be made of the $C_4H_9$, $C_6H_{11}$, $C_9H_{19}$, $C_{11}H_{23}$, $C_{12}H_{25}$, $C_{17}H_{35}$, $C_{18}H_{37}$, $C_{21}H_{43}$, $C_{22}H_{45}$ groups.

According to another variant of the invention, the integer m has a value of 1. The R group, R' group and/or the X group then comprise a group chosen from at least one hydrocarbon-based chain having at least 4 carbon atoms, at least one aliphatic ring having 3 to 8 atoms, at least one aliphatic, partially aromatic or entirely aromatic fused polycyclic system, each ring comprising 5 or 6 atoms, taken alone or in a mixture.

Preferably, the X group represents a saturated, linear hydrocarbon-based chain comprising from 1 to 22 carbon atoms. Preferably, the X group is chosen from $C_2H_4$ and $C_3H_6$ groups.

The X group may also be a cyclohexyl group or a phenyl group, the R—$(NH)_n$CONH— and NHCO$(NH)_n$—R'— radicals may then be in the ortho, meta or para position. Moreover, they may be in the cis or trans position with respect to one another. Furthermore, when the X radical is cyclic, this ring may be substituted with groups other than the two main groups R—$(NH)_n$CONH— and —NHCO$(NH)_n$—R'.

The X group may also comprise two or more aliphatic and/or aromatic, fused or non-fused rings. Thus, according to a preferred variant of the invention, the X group is a group comprising two aliphatic rings linked via a CH$_2$ group which is optionally substituted, such as, for example:

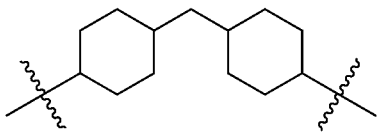 [SMILES: *C1CCC(CC2CCC(*)CC2)CC1]

According to another variant of the invention, the X group is a group comprising two aromatic rings linked via a CH$_2$ group which is optionally substituted, such as, for example:

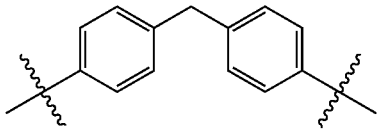 [SMILES: *c1ccc(Cc2ccc(*)cc2)cc1]

Other particular compounds are ureide derivatives, including a particular urea, 4,4'-bis(dodecylaminocarbonylamino)-diphenylmethane, which has the formula:

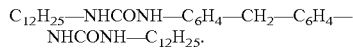

According to a particular preferred embodiment, the chemical additive is a compound of general formula (II), in which the integer n has a value of 0.

Among the compounds preferred according to the invention, mention may be made of the hydrazide derivatives corresponding to the following formulae:

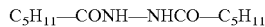

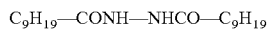

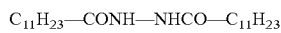

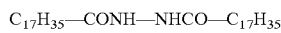

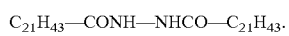

Mention may also be made of the diamides, a preferred diamide of which is N,N'-ethylenedi(stearamide), C$_{17}$H$_{35}$—CONH—CH$_2$—CH$_2$—NHCO—C$_{17}$H$_{35}$.

As hydrazide derivative, mention may also be made of 2',3-bis[(3-[3,5-di-tert-butyl-4-hydroxyphenyl]propionyl)]propionohydrazide.

According to one particular embodiment, the road bitumen comprises from 0.1% to 5% by weight, preferably from 0.5% to 4% by weight, more preferentially from 0.5% to 2.5% by weight of the chemical additive relative to the total weight of said bitumen.

According to another particular embodiment, the road bitumen comprises from 5% to 30% by weight, preferably from 6% to 28% by weight, more preferentially from 7% to 26% by weight of the chemical additive relative to the total weight of said bitumen.

According to one particular embodiment, a road bitumen is prepared by bringing into contact:

at least one bitumen base,
between 0.1% and 5% by weight, preferably between 0.5% and 4% by weight and more preferentially between 0.5% and 2.5% by weight of a chemical additive,
and between 0.05% and 15% by weight, preferably between 0.1% and 10% by weight and more preferentially between 0.5% and 6% by weight of an olefinic polymer adjuvant.

According to another particular embodiment, a road bitumen is prepared by bringing into contact:

at least one bitumen base,
between 5% and 30% by weight, preferably between 6% and 28% by weight, more preferentially between 7% and 26% by weight of the chemical additive relative to the total weight of said bitumen,
and between 0.05% and 15% by weight, preferably between 0.1% and 10% by weight and more preferentially between 0.5% and 6% by weight of an olefinic polymer adjuvant.

The bitumen base and the chemical additive are as described above.

The olefinic polymer adjuvant is preferably chosen from the group consisting of (a) ethylene/glycidyl (meth)acrylate copolymers; (b) ethylene/monomer A/monomer B terpolymers and (c) copolymers resulting from the grafting of a monomer B onto a polymer substrate.

(a) The ethylene/glycidyl (meth)acrylate copolymers are advantageously chosen from random or block, preferably random, copolymers of ethylene and of a monomer chosen from glycidyl acrylate and glycidyl methacrylate, comprising from 50% to 99.7% by weight, preferably from 60% to 95% by weight and more preferentially from 60% to 90% by weight of ethylene.

(b) The terpolymers are advantageously chosen from random or block, preferably random, terpolymers of ethylene, of a monomer A and of a monomer B.

The monomer A is chosen from vinyl acetate and C$_1$ to C$_6$ alkyl acrylates or methacrylates.

The monomer B is chosen from glycidyl acrylate and glycidyl methacrylate.

The ethylene/monomer A/monomer B terpolymers comprise from 0.5% to 40% by weight, preferably from 5% to 35% by weight, more preferentially from 10% to 30% by weight of units derived from the monomer A, and from 0.5% to 15% by weight, preferably from 2.5% to 15% by weight of units derived from the monomer B, the rest being formed from units derived from ethylene.

(c) The copolymers result from the grafting of a monomer B, chosen from glycidyl acrylate and glycidyl methacrylate, onto a polymer substrate. The polymer substrate consists of a polymer chosen from polyethylenes, especially low-density polyethylenes, polypropylenes, random or block, preferably random, copolymers of ethylene and of vinyl acetate and random or block, preferably random, copolymers of ethylene and of C$_1$ to C$_6$ alkyl acrylate or methacrylate, comprising from 40% to 99.7% by weight and preferably from 50% to 99% by weight of ethylene. Said grafted copolymers comprise from 0.5% to 15% by weight, preferably from 2.5% to 15% by weight of grafted units derived from the monomer B.

The olefinic polymer adjuvant is preferably chosen from the ethylene/monomer A/monomer B terpolymers (b) described above.

Advantageously, the olefinic polymer adjuvant is chosen from random terpolymers of ethylene, of a monomer A chosen from C$_1$ to C$_6$ alkyl acrylates or methacrylates and of a monomer B chosen from glycidyl acrylate and glycidyl methacrylate, comprising from 0.5% to 40% by weight, preferably from 5% to 35% by weight and more preferably from 10% to 30% by weight of units derived from the monomer A and from 0.5% to 15% by weight and preferably from 2.5% to 15% by weight of units derived from the monomer B, the remainder being formed of units derived from the ethylene.

According to one particular embodiment, the bitumen comprises from 0.05% to 15% by weight, preferably from 0.1% to 10% by weight, more preferentially from 0.5% to 6% by weight of the olefinic polymer adjuvant relative to the total weight of said bitumen.

The amounts of the chemical additive and optionally of the olefinic polymer adjuvant are adjusted as a function of the nature of the bitumen base used. In particular, the penetrability targeted is of between 20 and 45 1/10 mm and the ring and ball softening temperature (RBT) targeted is preferably greater than 90° C., it being understood that the penetrability is measured at 25° C. according to standard EN 1426 and the RBT according to standard EN 1427.

According to a particular preferred embodiment, the road bitumen comprises a combination of the chemical additive of formula (II) and the olefinic polymer adjuvant, both described above.

The combination in which the chemical additive has a formula (II), where m=0, more preferentially where m=0 and n=0, will be preferred.

The combination in which the olefinic polymer adjuvant is chosen from the ethylene/monomer A/monomer B terpolymer (b) described above, will also be preferred.

More preferentially, the road bitumen comprises the chemical additive of formula (II), where m=0, more preferentially where m=0 and n=0, and the olefinic polymer adjuvant chosen from the ethylene/monomer A/monomer B terpolymers (b) described above.

The road bitumen as described above may also contain other known additives or other known elastomers for bitumen, such as the copolymers SB (copolymer comprising styrene and butadiene blocks), SBS (copolymer comprising styrene-butadiene-styrene blocks), SIS (styrene-isoprene-styrene), SBS* (star copolymer comprising styrene-butadiene-styrene blocks), SBR (styrene-b-butadiene-rubber) or EPDM (ethylene propylene diene modified). These elastomers may also be crosslinked according to any known process, for example with sulphur. Mention may also be made of elastomers produced from styrene monomers and from butadiene monomers allowing crosslinking without crosslinking agent, as described in documents WO 2007/058994 and WO 2008/137394 and by the applicant in patent application WO2011/013073.

According to a particular embodiment, the road bitumen consists solely of one or more bitumen bases and of one or more chemical additives as described above.

The subject of the invention relates to a process for the transportation and/or storage of a road bitumen under cold conditions, said bitumen being transported and/or stored in bitumen block form. The bitumen is as described above.

The term "transportation and/or storing under cold conditions" is intended to mean transportation and/or storage at a temperature of less than 100° C., preferably at an ambient temperature of less than 100° C. The temperature is preferably between 20° C. and 90° C., preferably between 20° C. and 80° C., more preferentially between 40° C. and 80° C., even more preferentially between 50° C. and 70° C., even more preferentially between 40° C. and 60° C.

The term "bitumen block" is intended to mean a block of road bitumen having a weight of between 1 kg and 1000 kg, preferably between 1 kg and 200 kg, more preferentially between 1 kg and 50 kg, even more preferentially between 5 kg and 25 kg, even more preferentially between 10 kg and 30 kg, said block advantageously being parallelepipedal, preferably being cobblestone-shaped.

The bitumen block preferably has a volume of between 1000 $cm^3$ and 50 000 $cm^3$, preferably between 5000 $cm^3$ and 25 000 $cm^3$, more preferentially between 10 000 $cm^3$ and 30 000 $cm^3$, even more preferentially between 14 000 $cm^3$ and 25 000 $cm^3$.

When the bitumen block is handled manually by a person, the weight of the bitumen block may vary from 1 to 20 kg, and from 20 to 50 kg in the case of handling by 2 people. When the handling is carried out by mechanical equipment, the weight of the bitumen block may vary from 50 to 1000 kg.

The bitumen block is manufactured from road bitumen as described according to any industrially known process, for example by extrusion, by moulding, or according to the manufacturing process described in the document US2011/0290695.

The bitumen block is advantageously wrapped in a hot-melt film according to any known method, preferably by a film made of polypropylene, polyethylene or a mixture of polyethylene and polypropylene. The bituminous composition packaged in bitumen blocks wrapped in a hot-melt film has the advantage of being ready to use, that is to say it may be heated directly in the melter without prior unwrapping or optionally introduced into the mixing unit for manufacturing road mixes. The hot-melt material that melts with the bitumen does not affect the properties of said bitumen.

The bitumen block may also be packaged in a box according to any known process.

In particular, the bitumen block is packaged in a box by pouring the hot bitumen into a box, the wall of the inner face of which is silicone based, then cooled, the dimensions of the box being suited to the desired bitumen block weight and/or volume.

When the bitumen block according to the invention is wrapped in a hot-melt film or is packaged in a box, the applicant has demonstrated that the deterioration of said hot-melt film or of said box during the transportation and/or storage, under cold conditions, of said bitumen block, did not give rise to the creeping of said bitumen. Consequently, the bitumen blocks according to the invention retain their initial shape and do not adhere to one another during their transportation and/or storage under cold conditions, despite the fact that the hot-melt film or the box may be damaged. The absence of creep of the bitumen in block form during its transportation and/or storage under cold conditions is due to the presence of at least one chemical additive of formula (I) or (II) within the bitumen.

The subject of the invention also relates to the use of the bitumen block as described above as road binder.

Generally, when the bitumen block according to the invention is composed of concentrated road bitumen, the latter is melted then diluted with at least one other additive-free bitumen base, in order to obtain a road bitumen which may be used as road binder.

The road binder may in turn be used to manufacture mixes, in combination with aggregates according to any known process. The bituminous mixes are used as materials for the construction and maintenance of road foundations and their surfacing, and also for carrying out all roadworks. Mention may, for example, be made of surface coatings, hot mixes, cold mixes, cold-poured mixes, grave emulsions, base layers, bond layers, tie layers and running layers, and other combinations of a bituminous binder and of the road aggregate having particular properties, such as anti-rutting layers, draining mixes, or asphalts (mixture between a binder and aggregates of the sand type).

The bitumen blocks according to the present invention are noteworthy in that they enable the optimum conditions for the transportation and/or storage of road bitumen under cold conditions, in particular without there being any creep of said blocks during their transportation and/or storage, even when the ambient temperature is high, and without degrading the properties of said road bitumen for a road application, or even improving them.

The various embodiments, variants, preferences and advantages described above for each of the subjects of the invention apply to all the subjects of the invention and may be taken separately or in combination.

The invention is illustrated by the following examples given in a non-limiting manner.

Examples

The rheological and mechanical characteristics of the bitumens to which reference is made in these examples are measured in the manner indicated in Table 1.

- a bitumen base of 13/40 grade having crosslinked polymers, denoted $B_7$, having a penetrability $P_{25}$ of 47 1/10 mm and an RBT of 66.4° C. and commercially available from the group TOTAL under the brand name STYRELF®;
- a bitumen base of 30/45 grade, denoted $B_8$, having a penetrability $P_{25}$ of 37 1/10 mm and an RBT of 81.2° C., commercially available from the group TOTAL under the brand name ALTEK PM 30/45®;
- a styrene/butadiene diblock copolymer, denoted SB, having an amount by weight of styrene of 30% relative to the weight of the copolymer, sold by the company KRATON under the name D1184 A;
- a Fischer-Tropsch wax, commercially available from the company SASOL under the brand name Sasobit®;
- sebacic acid;
- a chemical additive, 2',3-bis[[3-[3,5-di-tert-butyl-4-hydroxyphenyl]propionyl]]propionohydrazide, denoted hydrazide.

The weight percentage amounts used for each bitumen are indicated in Table 2 below.

TABLE 2

| | Bitumen | | | | | | | | | | |
|---|---|---|---|---|---|---|---|---|---|---|---|
| | $B_1$ (control) | $B_2$ (control) | $B_3$ | $B_4$ | $B_9$ | $B_{10}$ | $B_{11}$ | $B_{12}$ | $B_{13}$ | $B_{14}$ | $B_{15}$ |
| Bitumen base $B_0$ | 95% | 96.5% | 98.6% | 99.15% | — | — | — | — | — | — | — |
| Bitumen base $B_5$ | — | — | — | — | 98.5% | 98.4% | — | — | — | 92.5% | 75% |
| Bitumen base $B_6$ | — | — | — | — | — | — | 98.5% | — | — | — | — |
| Bitumen base $B_7$ | — | — | — | — | — | — | — | 98.5% | — | — | — |
| Bitumen base $B_8$ | — | — | — | — | — | — | — | — | 98.5% | — | — |
| SB | 5% | — | — | — | — | — | — | — | — | — | — |
| Sasobit ® | — | 3.5% | — | — | — | — | — | — | — | — | — |
| Sebacic acid | — | — | 1.4% | — | 1.5% | 1.6% | 1.5% | 1.5% | 1.5% | 7.5% | 25% |
| Hydrazide | — | — | — | 0.85% | — | — | — | — | — | — | — |
| $P_{25}$ (1/10 mm) | 27 | 28 | 25 | 29 | 31 | 26 | 31 | 36 | 37 | 29 | 27 |
| RBT (°C) | 95 | 86 | 109 | 106 | 93 | 96.5 | 112.5 | 69 | 81.2 | 103 | 84 |

TABLE 1

| Property | Abbreviation | Unit | Measurement standard |
|---|---|---|---|
| Needle penetrability at 25° C. | $P_{25}$ | 1/10 mm | NF EN 1426 |
| Ring and ball softening temperature | RBT | ° C. | NF EN 1427 |
| Cylinder viscosity | η | Pa · s | NF EN 13702 |

Bitumens $B_1$, $B_2$, $B_3$, $B_4$, $B_9$, $B_{10}$, $B_{11}$, $B_{12}$, $B_{13}$, $B_{14}$, and $B_{15}$ Various bitumens $B_1$, $B_2$, $B_3$, $B_4$, $B_9$, $B_{10}$, $B_{11}$, $B_{12}$, $B_{13}$, $B_{14}$ and $B_{15}$ are prepared from the following products:
- a bitumen base of 35/50 grade, denoted $B_0$, having a penetrability $P_{25}$ of 34 1/10 mm and an RBT of 54.4° C. and commercially available from the group TOTAL under the brand name AZALT®;
- a bitumen base of 50/70 grade, denoted $B_5$, having a penetrability $P_{25}$ of 58 1/10 mm and an RBT of 52° C. and commercially available from the group TOTAL under the brand name AZALT®;
- a bitumen base of 50/70 grade, denoted $B_5$, having a penetrability $P_{25}$ of 55 1/10 mm and an RBT of 49.6° C. and commercially available from the group TOTAL under the brand name AZALT®;

The amount of additives for each bitumen is adjusted so as to obtain bitumens having equivalent mechanical properties, especially a similar penetrability $P_{25}$ and a similar RBT.

The bitumens are prepared in the following way.

For the bitumen $B_1$, the bitumen base $B_0$ and the SB copolymer are introduced into a reactor maintained at 185° C. and with stirring at 300 revolutions/min. The content of the reactor is then maintained at 185° C. with stirring at 300 revolutions/min for 4 hours.

For the bitumen $B_2$, the bitumen base $B_0$ is introduced into a reactor maintained at 165° C. with stirring at 300 revolutions/min. The Fischer-Tropsch wax is then introduced into the reactor. The content of the reactor is maintained at 165° C. with stirring at 300 revolutions/min for 1 hour.

The preparations of the bitumens $B_3$ and $B_4$ are produced by first introducing the bitumen base $B_0$ into a reactor at 160° C. with stirring at 300 revolutions/min. The sebacic acid ($B_3$) or the hydrazide ($B_4$) is then added in granular form. The mixtures are stirred for approximately 1 hour at 160° C. so as to obtain a final homogeneous appearance. The mixtures are cooled to ambient temperature.

The preparations of the bitumens $B_9$ and $B_{10}$ are prepared from the bitumen base $B_5$ in the same way as the preparation of bitumen $B_3$.

The preparation of the bitumen $B_{11}$ is prepared from the bitumen base $B_6$ in the same way as the preparation of the bitumen $B_3$.

For the bitumen $B_{12}$, the bitumen base $B_7$ is introduced into a reactor maintained at 160° C. and with stirring at 300 revolutions/min, then the acid is added. The mixture is stirred for approximately 1 hour at 160° C. so as to obtain a final homogeneous appearance. The mixture is cooled to ambient temperature.

For the bitumen $B_{13}$, the bitumen base $B_8$ is introduced into a reactor maintained at 160° C. and with stirring at 300 revolutions/min, then the acid is added. The mixture is stirred for approximately 1 hour at 160° C. so as to obtain a final homogeneous appearance. The mixture is cooled to ambient temperature.

The preparations of the bitumens $B_{14}$ and $B_{15}$ are prepared from the bitumen base $B_5$ in the same way as the preparation of bitumen $B_3$.

Study of the Ageing Properties of the Bitumens $B_0$, $B_3$, $B_5$ and $B_9$

The ageing of the bitumens $B_0$ and $B_3$ and also the bitumens $B_5$ and $B_9$ were studied according to the following protocol: $B_0$, $B_3$, $B_5$ and $B_9$ undergo a first ageing according to the RTFOT (Rolling Thin Film Oven Test) method as described in standard NF EN 12607-1, then undergo a second test based on the principle of the PAV (Pressure ageing Vessel) test as described in standard ASTM D6521.

The ageing resistance properties of the bitumens $B_0$ and $B_3$ and of the bitumens $B_5$ and $B_9$ measured according to the standards mentioned above are listed in Table 3 below:

TABLE 3

| Bitumen | $B_0$ | $B_3$ | $B_5$ | $B_9$ |
|---|---|---|---|---|
| $P_{25}$ (1/10 mm) | 34 | 25 | 58 | 31 |
| Cylinder viscosity (Pa · s) at: | | | | |
| 120° C. | 1.940 | 1.965 | 1.92 | 1.91 |
| 130° C. | 1.030 | 0.991 | 1.08 | 0.95 |
| 140° C. | 0.620 | 0.535 | 0.62 | 0.59 |
| 150° C. | 0.375 | 0.360 | 0.41 | 0.35 |
| 160° C. | 0.224 | 0.230 | 0.24 | 0.21 |
| After RTFOT ageing | | | | |
| $P_{25}$ (1/10 mm) | 25 | 21 | 31 | 31 |
| Cylinder viscosity (Pa · s) at: | | | | |
| 120° C. | 3.140 | 3.279 | 3.38 | 3.67 |
| 130° C. | 1.610 | 1.621 | 1.74 | 1.94 |
| 140° C. | 0.898 | 0.942 | 1.01 | 1.06 |
| 150° C. | 0.537 | 0.564 | 0.58 | 0.64 |
| 160° C. | 0.343 | 0.352 | 0.39 | 0.38 |
| After RTFOT and PAV ageing | | | | |
| $P_{25}$ (1/10 mm) | 18 | 19 | 23 | 21 |
| Isomodulus temperature at 300 MPa (° C.) | −12.6 | −13.0 | −16.1 | −15.6 |
| Isomodulus temperature gradient at 300 MPa | 0.273 | 0.266 | 0.288 | 0.28 |
| Critical temperature (m = 0.300) (° C.) | −8.5 | −8.4 | −14.2 | −13.3 |

The bitumens $B_3$ and $B_9$ have, respectively, ageing resistance properties equivalent to the additive-free bitumen bases $B_0$ and $B_5$. The viscosity values of the bitumens $B_3$ and $B_9$ remain virtually identical, respectively, relative to those of the bitumen bases $B_0$ and $B_5$. The ability of the bitumens $B_3$ and $B_9$ to be handled under hot conditions therefore remains unchanged, respectively, relative to the bitumen bases $B_0$ and $B_5$.

Moreover, the properties of the bitumens $B_3$ and $B_9$ according to the invention are not affected after RTFOT ageing. The RTFOT test shows that the penetrabilities decrease less in the bitumens $B_3$ and $B_9$, respectively, than in the starting bitumen bases $B_0$ and $B_5$, after simulated ageing.

Thus, the addition of sebacic acid to the bitumen bases $B_0$ and $B_5$ does not modify their properties and therefore makes it possible to obtain a binder having the necessary specifications for a road application.

Preparation of the Bitumen Blocks $P_1$ to $P_5$ and $P_9$ to $P_{18}$

Bitumen blocks $P_1$ to $P_5$ and $P_9$ to $P_{15}$, are prepared from the bitumens $B_1$ to $B_5$ and $B_9$ to $B_{15}$, respectively, according to the following method. A weight of approximately 0.5 kg of bitumen is poured at 160° C. into a rectangular steel mould covered with a hot-melt polyethylene film. The mould is then cooled to ambient temperature, then the mould is removed.

A bitumen block $P_{16}$ is prepared industrially by moulding from the bitumen $B_9$.

Bitumen blocks $P_{17}$ and $P_{18}$ are prepared, respectively, from the concentrated bitumen blocks $P_{14}$ and $P_{15}$.

In order to obtain the bitumen block $P_{17}$, the bitumen block $P_{14}$ is melted then mixed with the bitumen $B_5$ of 50/70 grade, heated beforehand to 160° C. The mixture obtained in this way is stirred for approximately 1 hour at 160° C. to obtain a final homogeneous appearance, then poured at 160° C. into a rectangular steel mould covered with a hot-melt polyethylene film. The mould is then cooled to ambient temperature, then the mould is removed. The bitumen block $P_{17}$ obtained in this way comprises approximately 1.5% sebacic acid, that is to say that the weight ratio of the mixture between the block $P_{14}$ and the bitumen $B_5$ is 1/5.

The bitumen block $P_{18}$ is obtained in the same way as the bitumen block $P_{17}$ from a mixture between the bitumen block $P_{15}$ and the bitumen $B_5$ with a weight ratio of the mixture between the block $P_{15}$ and the bitumen $B_5$ of 1/16.6.

Creep Test

A qualitative creep test is carried out beforehand. The bitumen blocks $P_1$ to $P_5$ and $P_9$ to $P_{13}$ obtained in this way are placed in ovens at different temperatures and under a load of 3.65 kg (+/−50 g) to simulate the stacking of the blocks on top of one another during the transportation and/or storage thereof. Indeed, it is estimated that 6 blocks are stacked vertically on a pallet during the transportation and/or storage of the bitumen blocks. Subsequently, the load of 3.65 kg (+/−50 g) corresponding to the load applied to a block of 500 g approximately equals the load applied to a block of 25 kg in a pallet containing 40 blocks and having a total weight of approximately 1000 kg.

The mathematical equation making it possible to calculate the load for a block of 25 kg within a 40-block pallet is $P=[(M*g)/S]/n$, with M being the load, i.e. approximately 1000 kg, g being the gravitational constant of 9.81 m·s$^{-2}$, S being the surface area of the pallet, i.e. 1.21 m$^2$ and n being the number of blocks in the pallet, i.e. 40.

The blocks are first placed in an oven at a temperature of 40° C. If no creep is observed after a certain amount of time, at most after 3 weeks, new blocks are moulded and placed at an oven temperature of 50° C. for at least 7 days. This operation is repeated, increasing the temperature by 10° C. up to a maximum temperature of 80° C. if no creep is observed, or up to the temperature at which significant creep of the blocks is observed if said temperature is less than 80° C. The creep is reflected visually by a deformation of the blocks and flowing of the bitumen.

Table 4 below lists the results of the creep test obtained for the various bitumen blocks.

TABLE 4

| | | Bitumen block | | | | | | | | | | |
|---|---|---|---|---|---|---|---|---|---|---|---|---|
| | | $P_1$ (control) | $P_2$ (control) | $P_3$ | $P_4$ | $P_5$ (control) | $P_9$ | $P_{10}$ | $P_{11}$ | $P_{12}$ | $P_{13}$ | $P_{16}$ |
| Oven temperature (°C) | 40 | + | + | +++ | +++ | + | +++ | +++ | +++ | +++ | +++ | +++ |
| | 50 | − | − | +++ | +++ | − | +++ | +++ | +++ | +++ | +++ | +++ |
| | 60 | nr* | nr* | +++ | +++ | nr* | +++ | +++ | +++ | +++ | +++ | +++ |
| | 70 | nr* | nr* | +++ | +++ | nr* | +++ | +++ | +++ | +++ | +++ | +++ |
| | 80 | nr* | nr* | ++ | ++ | nr* | ++ | +++ | +++ | +++ | ++ | ++ |

+++: no creep observed after 15 days
++: no creep observed after 7 days
+: slight creep observed after 3 days
−: significant creep in under 2 hours
*nr: not relevant; the creep test was not carried out at this temperature, insofar as the creep was observed at lower temperatures.

Only the bitumen blocks $P_3$ and $P_4$ and also the bitumen blocks $P_9$ to $P_{13}$ and $P_{16}$ according to the present invention do not creep under conventional storage and/or transportation conditions.

Creep Resistance Test

This test is carried out in order to evaluate the deformation resistance of each bitumen block $P_1$ to $P_5$, $P_7$ and $P_8$ obtained, respectively, from the bitumen bases $B_7$ and $B_8$ and also $P_9$ to $P_{13}$, $P_{17}$ and $P_{18}$ when this is subjected to a load and at a temperature of 50° C.

The actual creep resistance test is carried out using a texture analyser sold under the name LF Plus by the company LLOYD Instruments and equipped with a thermal chamber. To do this, a metal cylindrical container, containing a weight of 60 g of bitumen block, is placed inside the thermal chamber regulated at a temperature of 50° C. for 3 hours. The piston of the texture analyser is a cylinder with a diameter equal to 20 mm and which is 60 mm high. The cylindrical piston is placed in contact at the start with the upper surface of the bitumen block. It then moves vertically downward, at a constant speed of 1 mm/min, over a calibrated distance of 10 mm, so as to exert a compressive force on the upper surface of the bitumen block. The texture analyser measures the maximum compressive force applied by the piston to the bitumen block at 50° C. The measurement of the maximum compressive force makes it possible to evaluate the ability of the bitumen block to resist deformation. Thus, the greater this force, the better the deformation resistance of the bitumen block will be.

The results are listed in Table 5 below.

Although the paired values of penetrability $P_{25}$ and RBT of the bitumen blocks $P_1$ to $P_5$, $P_9$ to $P_{11}$ and $P_{16}$ are equivalent, these have different behaviour with regard to deformation. The same applies for the paired values of penetrability $P_{25}$ and RBT of the bitumen blocks $P_{12}$ and $P_{13}$ compared to the control bitumen blocks $P_7$ and $P_8$. Indeed, it is estimated that a bitumen block is sufficiently creep-resistant when the maximum compressive force is at least equal to 15 N at 50° C. This maximum compressive force value equates to conditions of transportation and/or storage of the bitumen blocks at temperatures at least equal to 50° C. Thus, the blocks $P_3$, $P_4$, $P_9$ to $P_{11}$ according to the invention are particularly creep-resistant compared to the control bitumen blocks $P_1$, $P_2$ and $P_5$. The same applies for the bitumen blocks $P_{12}$ and $P_{13}$ which are particularly strong compared to the control bitumen blocks $P_7$ and $P_8$. In addition, the block $P_4$ containing the hydrazide and the block $P_{11}$ are noteworthy insofar as the maximum compressive forces are, respectively, approximately 25 times higher and approximately 70 times higher than that applied, respectively, to the control bitumen blocks $P_1$ or $P_2$ and $P_7$ which will tend to creep during transportation and/or storage thereof, especially at temperatures of greater than or equal to 40° C., preferably of greater than or equal to 50° C., more preferentially of greater than or equal to 60° C.

Moreover, the bitumen blocks $P_{17}$ and $P_{18}$ are creep-resistant at temperatures of at least equal to 50° C., given that their maximum compressive force is greater than 15 N, that is to say, respectively, 21.5 N and 19 N. The compressive forces of the bitumen blocks $P_{17}$ and $P_{18}$ are at least five times greater than the compressive force of the control bitumen block $P_5$.

TABLE 5

| | Bitumen block | | | | | | | |
|---|---|---|---|---|---|---|---|---|
| | $P_1$ (control) | $P_2$ (control) | $P_3$ | $P_4$ | $P_5$ (control) | $P_9$ | $P_{10}$ | $P_{11}$ |
| Maximum compressive force (N) | 3.95 | 4.40 | 43.6 | 110.84 | 3.6 | 40.4 | 31.3 | 43.6 |

| | Bitumen block | | | | | | |
|---|---|---|---|---|---|---|---|
| | $P_7$ (control) | $P_8$ (control) | $P_{12}$ | $P_{13}$ | $P_{16}$ | $P_{17}$ | $P_{18}$ |
| Maximum compressive force (N) | 1.9 | 4 | 139 | 73 | 40.4 | 21.5 | 19 |

It is observed that the dilution of the concentrated bitumen blocks $P_{14}$ and $P_{15}$ to obtain the bitumen blocks $P_{17}$ and $P_{18}$ does not cause any deterioration in the creep resistance of said bitumen blocks. The bitumen blocks $P_{17}$ and $P_{18}$ obtained by dilution of concentrated bitumen block have creep resistances similar to those of the bitumen blocks obtained directly, that is to say without a step of dilution of concentrated bitumen block, such as the bitumen blocks $P_3$ and $P_{10}$. Consequently, the bitumen blocks $P_{17}$ and $P_{18}$ obtained "indirectly" (concentration then dilution) do not creep during the transportation or storage thereof, especially at temperatures of greater than or equal to 40° C., preferably of greater than or equal to 50° C., more preferentially of greater than or equal to 60° C., unlike the control bitumen block $P_5$.

Thus, the bitumen blocks according to the invention do not stick to one another and retain their shape and their consistency even at a high ambient temperature. Thus, the transportation and/or storage are optimized for the bitumen blocks according to the invention, with easier, safe handling and minimized losses of bitumen.

Study of the Properties of the Bituminous Mixes $E_0$ and $E_3$

The mixes $E_0$, $E_3$, $E_5$ and $E_9$ were prepared, respectively, from the bitumens $B_0$, $B_3$, $B_5$ and $B_9$.

The mixes $E_0$, $E_3$, $E_5$ and $E_9$ comprise, respectively, 5.4% by weight of bitumen $B_0$, $B_3$, $B_5$ and $B_9$ and 94.6% by weight of aggregates, said percentages being calculated relative to the weight of the bituminous mix.

The mixes are prepared by mixing the bitumens and the aggregates at 165° C. according to a conventional process.

The properties of the mixes $E_0$, $E_3$, $E_5$ and $E_9$ measured above are listed in Table 6 below:

TABLE 6

| Mix | $E_0$ | $E_3$ | $E_5$ | $E_9$ |
|---|---|---|---|---|
| Duriez test [1] | | | | |
| Void content (%) | 10.3 | 9.8 | 9.8 | 9.8 |
| r (MPa) | 8.7 | 10.9 | 7.6 | 9.0 |
| R (MPa) | 10.5 | 12.8 | 8.8 | 10.4 |
| r/R (%) | 83 | 85.3 | 86 | 87 |
| Rutting [2] | | | | |
| Void content (%) | 6.6 | 6.8 | 7.0 | 6.8 |
| Depth of ruts at 30000 cycles (%) | 3.5 | 3.6 | 6.0 | 3.7 |
| Low temperature cracking (TSRST) [3] | | | | |
| Cracking temperature (° C.) | −24.6 | −23.0 | −27 | −26.7 |
| Cracking stress (MPa) | 4.38 | 4.20 | 4.55 | 4.4 |
| Modulus at 15° C., 10 Hz, trapezoidal test specimens [4] | | | | |
| Void content (%) | 3.7 | 3.6 | 3.8 | 3.9 |
| Modulus (MPa) | 11700 | 11700 | 8800 | 9300 |
| Fatigue at 10° C. [5] | | | | |
| Void content (%) | 4.0 | 3.8 | 3.7 | 3.9 |
| ε6 μdef | 124 | 135 | 140 | 130 |

[1] Test of resistance to water stripping according to standard NF EN 12697-12 (method B)
[2] Test of resistance to rutting according to standard NF EN 12697-22
[3] Test of low temperature cracking according to standard NF EN 12697-46
[4] Modulus of the mixes according to standard NF EN 12697-26
[5] Fatigue of the mixes according to standard NF EN 12697-24

The mixes produced with a bitumen according to the invention as road binder have identical properties compared to the mixes of the prior art $E_0$ and $E_5$. The addition of one or more additives according to the invention to a bitumen does not affect the properties of the mixes produced from such a bitumen.

Thus, for each test carried out, the void contents are comparable for $E_0$ and $E_3$ and also for $E_5$ and $E_9$, which means equivalent ability to be handled. This observation is consistent since the bitumens $B_0$ and $B_3$ and also the bitumens $B_5$ and $B_9$ have comparable viscosities between 120° C. and 160° C. (cf. Table 3). In addition, the resistance values r and R are higher for the mixes $E_3$ and $E_9$ than for the mixes $E_0$ and $E_5$.

The modulus and fatigue properties of the mix $E_3$ and $E_9$ are very satisfactory compared, respectively, to the mixes $E_0$ and $E_5$.

The invention claimed is:

1. Process for the transportation and/or storage of road bitumen under cold conditions, said process comprising:
   providing a road bitumen in block form, and
   transporting, and/or storing the road bitumen,
   wherein said road bitumen consists essentially of:
      at least one bitumen base,
      between 0.1% and 7.5% by weight of at least one chemical additive chosen from:
         a compound of general formula (I): $R^1$—(COOH)$_z$ wherein $R^1$ is a linear or branched, saturated or unsaturated hydrocarbon-based chain comprising from 4 to 68 carbon atoms, and z is an integer ranging from 1 to 4, or
         a compound of general formula (II): R—(NH)$_n$ CONH—(X)$_m$—NHCO(NH)$_n$—R' wherein:
            R and R', which are identical or different, contain a saturated or unsaturated, linear or branched, cyclic or acyclic hydrocarbon-based chain having from 1 to 22 carbon atoms and optionally comprising heteroatoms and/or rings having from 3 to 12 atoms and/or heterocycles having from 3 to 12 atoms;
            X contains a saturated or unsaturated, linear or branched, cyclic or acyclic hydrocarbon-based chain having from 1 to 22 carbon atoms and optionally comprising one or more heteroatoms and/or rings having from 3 to 12 atoms and/or heterocycles having from 3 to 12 atoms;
            n and m are integers having, independently of one another, a value of 0 or of 1, and
      optionally, between 0.05% and 15% by weight of an olefinic polymer adjuvant,
      the percentages being given by weight with respect to the total weight of bitumen,
   wherein a ring and ball softening temperature (RBT) of the bitumen is greater than 69° C., and a penetrability of the bitumen is of between 20 and 45 1/10 mm, where the RBT is measured according to standard EN 1427, and the penetrability is measured at 25° C. according to standard EN 1426, and
   wherein the bitumen block is not packaged or is packaged in a material selected from the group consisting of a box having a silicone-based inner wall, and a thermoplastic film.

2. Process according to claim 1, wherein said road bitumen is transported and/or stored at a temperature of less than 100° C.

3. Process according to claim 1, wherein said road bitumen is transported and/or stored at an ambient temperature of between 20° C. and 90° C.

4. Process according to claim 1, wherein the chemical additive is a compound of general formula (I): $R^1$—(COOH)$_z$ wherein $R^1$ is a linear or branched, saturated or unsaturated hydrocarbon-based chain comprising from 4 to 68 carbon atoms, and z is an integer ranging from 1 to 4.

5. Process according to claim 4, wherein said compound is a diacid of general formula HOOC—$C_wH_{2w}$—COOH, wherein w is an integer ranging from 4 to 22.

6. Process according to claim 4, wherein said compound is a diacid chosen from the group consisting of adipic acid, pimelic acid, suberic acid, azelaic acid, sebacic acid, undecanedioic acid, 1,2-dodecanedioic acid and tetradecanedioic acid.

7. Process according to claim 1, wherein the chemical additive is a compound of general formula (II): R—$(NH)_n$CONH—$(X)_m$—$NHCO(NH)_n$—R' wherein:
   R and R', which are identical or different, contain a saturated or unsaturated, linear or branched, cyclic or acyclic hydrocarbon-based chain having from 1 to 22 carbon atoms and optionally comprising heteroatoms and/or rings having from 3 to 12 atoms and/or heterocycles having from 3 to 12 atoms;
   X contains a saturated or unsaturated, linear or branched, cyclic or acyclic hydrocarbon-based chain having from 1 to 22 carbon atoms and optionally comprising one or more heteroatoms and/or rings having from 3 to 12 atoms and/or heterocycles having from 3 to 12 atoms;
   n and m are integers having, independently of one another, a value of 0 or of 1.

8. Process according to claim 7, wherein said compound comprises a hydrazide unit when n and m have a value of 0.

9. Process according to claim 8, wherein said R and/or R' groups, which are identical or different, comprise one or more aromatic monocyclic or polycyclic rings or heterocycles, optionally substituted by one or more hydroxyl functions and/or one or more saturated, linear or branched hydrocarbon-based chains, having from 1 to 6 carbon atoms.

10. Process according to claim 7, wherein said compound comprises two amide units when n has a value of 0 and m has a value of 1.

11. Process according to claim 7, wherein said R and/or R' groups, which are identical or different, comprise an aliphatic hydrocarbon-based chain having 4 to 22 carbon atoms.

12. Process according to claim 11, wherein said aliphatic hydrocarbon-based chain is chosen from the groups $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$, $C_{22}H_{45}$.

13. Process according to claim 7, wherein said X group comprises an aliphatic hydrocarbon-based chain having 1 to 2 carbon atoms.

14. Process according to claim 1, wherein the road bitumen comprises from 0.1% to 5% by weight of said chemical additive relative to the total weight of said bitumen.

15. Process according to claim 14, wherein the road bitumen comprises from 0.5% to 4% by weight of said chemical additive relative to the total weight of said solution.

16. Process according to claim 1, wherein the road bitumen comprises between 0.05% and 15% by weight of the olefinic polymer adjuvant.

17. Process according to claim 16, wherein the road bitumen comprises between 0.1% and 10% by weight of the olefinic polymer adjuvant.

18. Process according to claim 1, wherein the penetrability of the bitumen is of between 20 and 37 1/10 mm.

19. Process according to claim 18, wherein the penetrability of the bitumen is of between 25 and 37 1/10 mm.

20. Process according to claim 1, wherein the ring and ball softening temperature (RBT) is greater than 90° C.

21. Process according to claim 1, wherein the road bitumen maximum compressive force is at least equal to 15 N at 50° C.

22. Process according to claim 1, wherein said road bitumen is transported and/or stored at a temperature of between 40° C. and 80° C.

23. Process according to claim 1, wherein the bitumen block is not packaged.

24. Process according to claim 1, wherein the bitumen block is packaged in a box having a silicone-based inner wall.

25. Process according to claim 1, wherein the bitumen block is packaged in a thermoplastic film.

* * * * *